F. SCHIFFERLE.
Saucepan.
No. 107,818.　　　　　　　　　　　Patented Sept. 27, 1870.
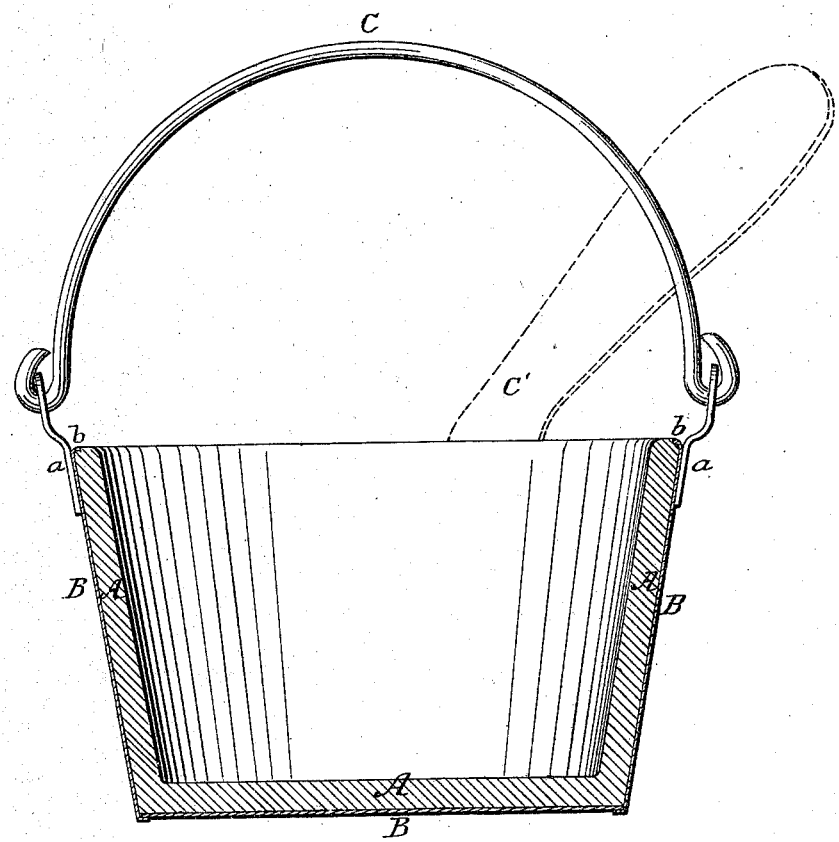
Witnesses.
John F. Fennell.
Henry N. Mygatt.
Inventor.
Fridolin Schifferle
By Newton Crawford
his attorney

United States Patent Office.

FRIDOLIN SCHIFFERLE, OF ST. LOUIS, MISSOURI.

Letters Patent No. 107,818, dated September 27, 1870.

IMPROVEMENT IN SAUCEPANS.

The Schedule referred to in these Letters Patent and making part of the same

I, FRIDOLIN SCHIFFERLE, of St. Louis, in the county of St. Louis, in the State of Missouri, have made certain Improvements in Saucepans or Kettles, of which the following is a specification.

In the drawing—

A represents an earthen vessel, made of clay, or clay and other substances chemically combined in any convenient form, and of any desired size.

B represents a sheet-metal jacket, completely surrounding and inclosing the vessel A, on its bottom and sides, and made to secure the earthen vessel firmly within itself, by turning a lip, $b$, over the top, as seen in the illustration, when the vessel A will be firmly held within the jacket B.

For the convenience of handling and using this pan or kettle, ears $a$ are attached to opposite sides of jacket B, near to the top edge thereof, and bail C is inserted and attached in the same manner as bails are attached in common tin or sheet-metal pails, or a handle, C', may be attached to one side of the jacket B, by riveting or otherwise, and projecting at an angle to the sauce-pan, as seen in broken lines in the drawing, forming, when complete, a saucepan in the usual shape, where a single handle is used.

Heretofore, sauce pans or kettles have been constructed and lined with a coating of tin, porcelain, glass, or other compound, and made to adhere to the inside of the metal pan or kettle, which is generally of cast metal. The lining or coating of the insides of such pans or kettles is liable to be destroyed or become useless, as the tin will, if the dish is empty, and too great heat applied, be melted, and then only the outside metal vessel remains; porcelain, glass, and composition linings that adhere to the metal body are liable to become detached from the same, and thereby the pan or kettle becomes worthless; and when the pan or kettle is lined with either of these kinds of lining, the cost is much more than the cost of the pan or kettle constructed as herein described, as when the earthen vessel becomes broken from any cause, it can be removed by turning back the metal edge $b$, and a new one can be put in its place, when the edge is again turned down, and the pan or kettle is as good as new.

The earthen vessel or lining is cheap, costing but a few cents for a common sized pan, while the sheet-metal jacket, which can be struck up or spun into shape, is also cheap, and the pan or kettle can be made for one-half the cost that the other methods require in their construction, are just as good, and can serve as many purposes as any other constructed pan or kettle.

The object, then, of the above-described invention is to introduce a cheaper, and yet as durable and complete a vessel for stewing fruit, making of jellies, preserves, and sauces, without their coming in contact with the metal of which the vessel is made, and thereby discoloring the contents by the introduction of oxygen, which is produced from the acid of the fruit acting upon the metal; and The invention consists in the construction of the pan or kettle, as that it will answer the purpose described.

I lay no claim to the earthen vessel, jacket, or the manner of attaching the bail or handle to the jacket, separately, as they are all old of themselves.

I am aware of the patent of E. B. Manning, dated February 9, 1869, for improvement in teapots, and disclaim the construction therein shown.

What I do claim, and desire to secure by Letters Patent, is—

The saucepan or kettle herein described, having the removable earthen vessel A, secured in the sheet-metal jacket B, in the manner and for the purpose shown.

FRIDOLIN SCHIFFERLE.

Witnesses:
EDM. F. BROWN,
JNO. F. FENNELL.